United States Patent [19]

Inami et al.

[11] 4,200,329
[45] Apr. 29, 1980

[54] REAR COMPARTMENT ARRANGEMENTS FOR VAN TYPE MOTOR VEHICLE

[75] Inventors: Fumiaki Inami; Akiyosi Okada, both of Aki, Japan

[73] Assignee: Toyo Kogyo Co., Ltd., Aki, Japan

[21] Appl. No.: 933,039

[22] Filed: Aug. 11, 1978

[30] Foreign Application Priority Data

Aug. 16, 1977 [JP] Japan .................. 52-109883[U]
Aug. 17, 1977 [JP] Japan .................. 52-110413[U]

[51] Int. Cl.² .................................................. B60N 1/10
[52] U.S. Cl. ........................................ 296/69; 297/118
[58] Field of Search ............... 296/37.1, 37.16, 23 H, 296/69, 63, 64, 65 A; 297/118

[56] References Cited

U.S. PATENT DOCUMENTS

| | | | |
|---|---|---|---|
| 1,980,559 | 11/1934 | Thompson | 296/69 X |
| 2,501,027 | 3/1950 | Carmichael | 296/69 X |
| 3,140,114 | 7/1964 | Stephenson et al. | 296/69 |
| 3,246,347 | 4/1966 | Mason | 296/69 X |

FOREIGN PATENT DOCUMENTS

352582  4/1961  Switzerland ................. 296/69
766832  1/1957  United Kingdom .......... 296/69

*Primary Examiner*—Robert R. Song
*Assistant Examiner*—Michael Mar
*Attorney, Agent, or Firm*—Wenderoth, Lind & Ponack

[57] ABSTRACT

A rear compartment arrangement for a van type motor vehicle or automobile which is composed of a reclinable seat including separable cushioning and reclining seat-portions and two pairs of supporting members, each pair attached to the respective inner surfaces of a pair of side body panels, the supporting member extending horizontally in the direction of driving and positioned vertically with respect to each other in parallel relation, wherein when the seat-portions are disassembled they are supported on the supporting members in the direction of driving by the two upper supporting members of each pair by engagement of respective lugs which are provided on the seat-portions in grooves which are provided on the supporting members, so that the rear compartment is for example, divided into two spaces which are superposed one on top of the other.

7 Claims, 20 Drawing Figures

Fig. 9 (II)

Fig. 9 (III)

Fig. 10 (II)

Fig. 10 (III)

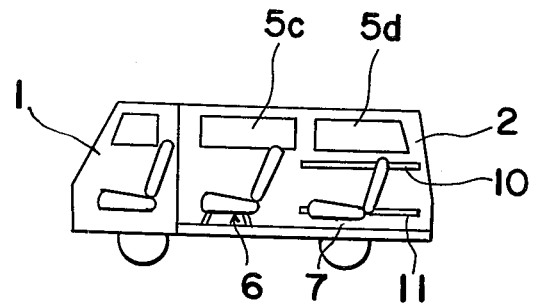
Fig. 12 (I)
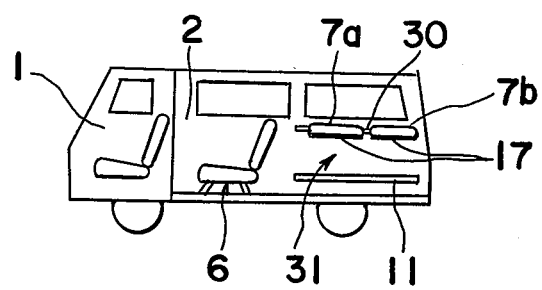
Fig. 12 (II)
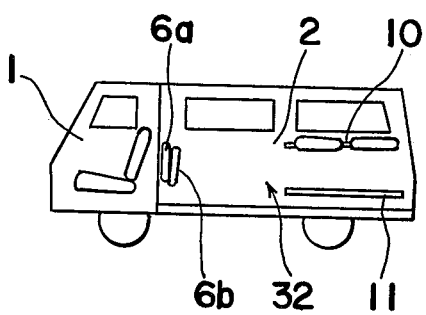
Fig. 12 (III)
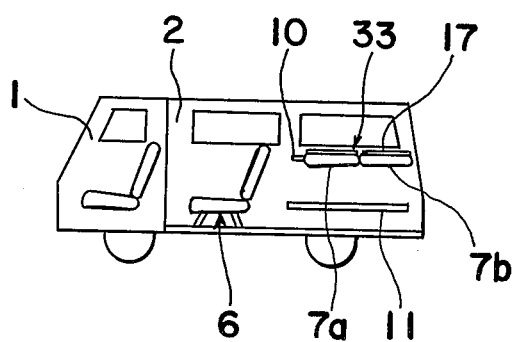
Fig. 12 (IV)

REAR COMPARTMENT ARRANGEMENTS FOR VAN TYPE MOTOR VEHICLE

BACKGROUND OF THE INVENTION

This invention relates to an inner construction of the rear compartment of a van type motor vehicle and more particularly, to simplified arrangements including provisions for converting the rear compartment with a pair of front and back seats into either a space for sleeping or a space for storing gear or a space for both purposes.

Today, van type motor vehicles, which are conventionally used for transporting gear are often used as a camper because of their large rear compartment.

However, when a conventional van type motor vehicle which is neither equipped with any special arrangements for conversion to a camper nor specifically provided with a space to sleep in is temporarily used for the above described purpose, the back portion of the reclining back seat disposed in the rear compartment is reclined fully backwards to convert it into a temporary bed.

In the above described situation, the combination of two seats provided in the rear compartment is too small for use therein as a bed so that it becomes necessary to provide another seat if it is desired to use the rear compartment for the described purpose. The provision of two rows of back seats in a known manner will however, extremely reduce the space for gear and thus the rear compartment of the van type motor vehicle cannot be used in a dual capacity providing space for sleeping and space for carrying gear.

Therefore, if a van type motor vehicle with a special arrangement in which the rear compartment which is normally intended for storing gear is readily convertible into the space used for the above-described purposes through simple procedures is provided, such a van type motor vehicle may be conventionally used for many purposes as described below.

SUMMARY OF THE INVENTION

Accordingly, an essential object of the present invention is to provide a rear compartment arrangement for a van type motor vehicle which includes provisions for converting the rear compartment, with a pair of front and back seats, into either a space for storing gear or a space for sleeping including a space for beds or a space for both purposes mentioned above in an efficient manner.

Another important object of the present invention is to provide a rear compartment arrangement for a van type motor vehicle of the above described type which is simple in construction and easy to handle and can be readily incorporated into presently existing motor vehicles at a low cost.

In accomplishing these and other objects, according to one preferred embodiment of the present invention, there is provided an arrangement including provisions for converting the rear compartment of a van type motor vehicle with a pair of front and back seats into a space used for multiple purposes, which comprises at least one seat positioned in the rear portion thereof and including a separable, cushioned seat-portion and a reclining seat-portion to form a reclinable type seat while being transversely positioned with respect to the direction of advance of the vehicle and at least a pair of respective supporting members fixedly attached to the inside surface of a pair of side panels extending in a horizontal direction in the direction of advance of the vehicle, each supporting member on the respective inside surfaces being positioned opposite to each other at the same vertical height which is approximately at the center between the floor and the ceiling of the rear compartment. The respective seat-portions are provided with engaging means, while the respective supporting members are provided with means for receiving the engaging means in a manner described hereinbelow.

More specifically, a pair of lugs are provided on the side faces of the seat-portions, while a number of grooves are provided respectively on the supporting members in a manner so that the pair of seat-portions can be assembled as a reclining type seat with the confronting pair of the supporting members, but also the respective seat-portions can be disassembled and flatly positioned on the pair of supporting members confronting each other as mentioned above through respective lug and opening connections.

By the arrangement described in the foregoing the space of the rear compartment is divided into two superposed spaces whereby the upper space with the pair of sideassembled seat-portions has a bed and the lower space becomes available as a space either for storing gear or for sleeping.

Furthermore, since the rear face of the respective seat-portions is generally lined with a hard board, both spaces may be available for storing gear when the respective seat-portions with the rear surfaces facing up are supported in a similar manner as described in the foregoing.

Many embodiments of this invention for effectively using the rear compartment will be described in detail in the remainder of this specification.

Furthermore, according to one embodiment of the lug and opening arrangement of the present invention, the first lug of the pair of lugs provided on the respective side faces of the seat portion parallel to the direction of advance of the vehicle is a lug fixedly mounted on the side face mentioned above and having an approximately rectangular cross section with its longer dimension extending parallel to the direction of advance of the vehicle, while the second lug of the pair having an almost round cross section is arranged to resiliently project from the side face mentioned above. The arrangement of the first and second lugs is the same on both side faces of the seat.

The opening provided on the supporting member for accommodating the first lug therein has a resilient member located therein having a rectangular, horizontal opening having a width which is wider than one dimension of the cross section of the first lug while being narrower than a second dimension of the cross section of the first lug, and an approximately circular, vertically formed opening above and connecting with the horizontal opening and having appropriate dimensions for allowing the first lug to be accommodated in the horizontal opening by insertion therein and by rotation through the horizontal opening in a pivotal manner. Further, on the supporting member is a second resilient member located in a second opening in the supporting member for accommodating the second lug therein, the second resilient member comprising an upper, horizontally flat portion with the edge closest to the center of the rear compartment being slanted downward at a slight angle and a flat wall recessed from the lower wall of the inner edge combining to form a groove whereby the projecting lug approaches the second opening in a horizontal position from an approximately vertical direction after the first lug has already been accommodated in the first opening, the projecting lug is then forced into the side wall of the seat member by the slanting wall until it clears it and subsequently projects and is held firmly in the above described groove.

BRIEF DESCRIPTION OF THE DRAWINGS

These and other objects and features of the present invention will become apparent from the following description taken in conjunction with the preferred embodiment thereof with reference to the accompanying drawings in which;

FIG. 12 (I, II, III, IV) schematically shows various embodiments of the utilization of the rear compartment of the present invention.

Before the description of the present invention proceeds, it is to be noted that like parts are designated by like reference numerals throughout the several views of the accompanying drawings.

DETAILED DESCRIPTION OF THE INVENTION

Figure 1:
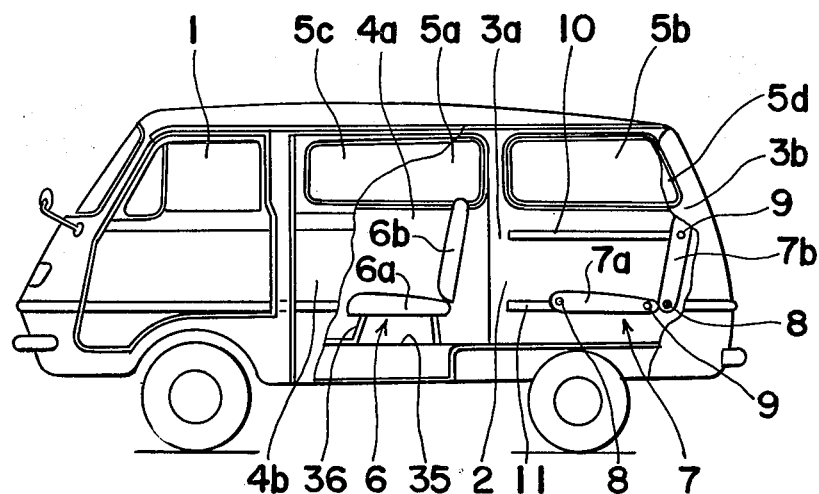
FIG. 1 is a schematic side elevational view partly broken away, of a van type motor vehicle, showing the rear compartment arrangement of the present invention.

Referring now to the drawings, there is shown in FIGS. 1 to 5, one preferred embodiment of the present invention, in which the rear compartment of a van type motor vehicle, occupying a compartment 2 immediately behind a front driving compartment 1, comprises a pair of side panels or walls 3a and 3b and a contiguous top roof-covering and having a pair of supporting members 10 and 11 fixedly attached to the respective inside surfaces thereof, each pair of supporting members being positioned vertically in parallel relation to each other, a sliding door 4a which forms a middle portion of an outer side covering of the van type motor vehicle, a covering portion 4b confronting the door mentioned above, and side windows 5a to 5d provided on the respective upper portions of the side coverings and the door 4a. A front seat 6 is positioned in the front portion of the rear compartment 2, and a back seat 7 is positioned in the back portion of the rear compartment 2, both of which are respectively composed of cushioned seat-portions 6a and 7a, and reclining seat-portions 6b and 7b both are positioned parallel to each other transverse to the direction of advance of the vehicle.

Specifically, the front seat 6 is fixed to the floor 35 by means of its leg-portions 36 which are attached to the cushioned seat-portion 6a thereof in a known manner. The reclining seat-portion 6b is hinged to the cushioned seat-portion 6a at the bottom end thereof and therefore, the portion 6b is capable of being reclined in a known manner. Moreover, as will be specifically described below, the front seat 6 is arranged to be hung in a hanger (not shown) which is located at a forward end wall of the rear compartment 2 with the respective seat-portions of the front seat 6 being folded up.

As mentioned in the foregoing, the back seat 7 comprises the cushioned seat-portion 7a, and the reclining seat-portion 7b. These seat-portions 7a and 7b are arranged for fixedly engaging and disengaging from the supporting members 10 and 11 through an opening and lug arrangement, the preferred embodiments being described hereinbelow. Furthermore, the supporting member 11 may be omitted so that the cushioned seat-portion 7a can be supported in the same manner as the front seat portion 6A.

Figure 2:
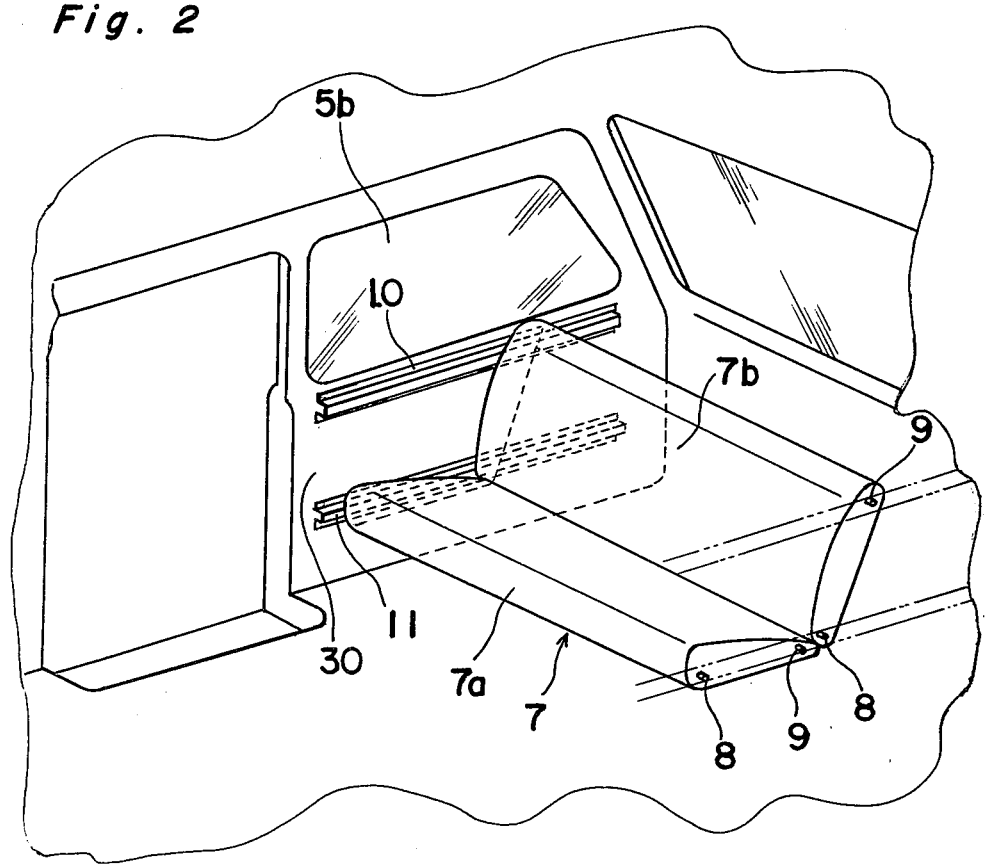
FIG. 2 is a partial perspective view of the rear compartment of the motor vehicle of FIG. 1.

Each pair of the supporting members 10 and 11 are attached to the respective inner walls 3a and 3b of the rear compartment 2, while each of the pair extend parallel to each other along the respective side walls horizontally in the direction of movement of the van type vehicle. Furthermore, as is obvious from the arrangement of these pairs of supporting members, the respective vertical heights of the laterally opposed members 10 and 11 above the van floor are the same, the respective upper supporting members 10 being located on the panels 5a or 5d approximately at the center between the floor 35 and the ceiling of the rear compartment, while the respective bottom supporting members 11 are located at the same level as that of the cushioned seat-portion 6a of the front seat 6 as shown in FIGS. 1 and 2.

Figure 3:
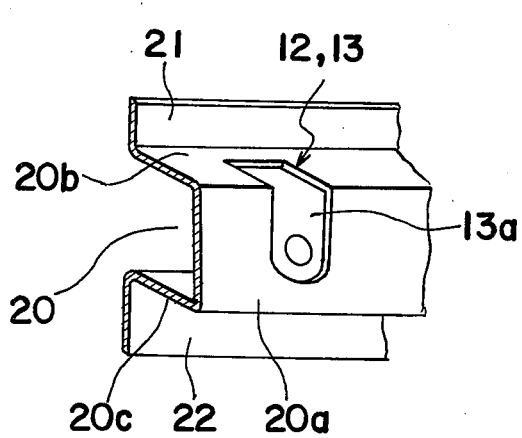
FIG. 3 is a fragmentary perspective view of supporting members employed in the rear compartment arrangement of FIG. 1.
Figure 5:
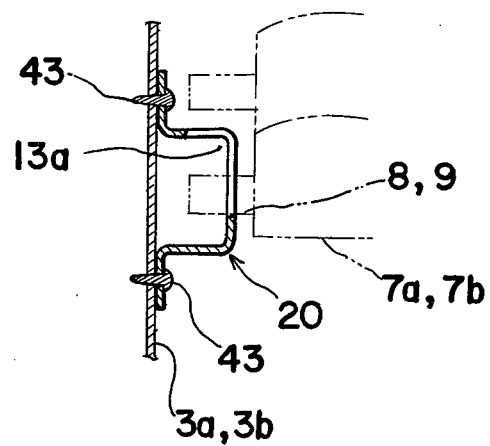
FIG. 5 is a sectional side view of the supporting members of FIG. 3.

As shown in FIG. 3, respective supporting members 10 and 11 are formed having a U-shaped cross section and comprise a projecting portion 20 including a side flat portion 20a and a top portion 20b and bottom portion 20c, a pair of flanges 21 and 22 extending vertically from the top and bottom portions 20b and 20c which are intended for fixedly attaching the supporting member to the inner walls 3a and 3b by means of a number of set screws 43 extending therethrough as specifically shown in FIG. 5 and a number of openings 13 provided at predetermined intervals in the longitudinal direction thereof each extending from the top portion 20b to the side flat portion 20a, the top portion 20b having a rectangular cut out portion and the side portion 20a having an approximately rectangular cut out portion continuous with the cut out portion of top portion 20b as shown in FIG. 3. Specifically, a number of openings as described above are provided on the respective, long supporting members in a manner such that not only can the pair of seat-portions be assembled as a reclinable seat by means of the confronting pair of the supporting members 10 in an ordinary way, but also the respective seat-portions can be disassembled and parallelly positioned by the pair of supporting members 10 through respective lug and opening connections as will be specifically described hereinbelow.

Figure 4:
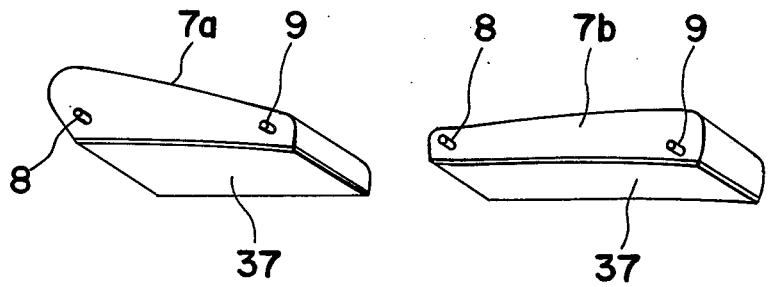
FIG. 4 is a perspective view showing the construction of a reclining seat-portion and a cushioned seat-portion of the present invention.

As shown in FIG. 4, the cushioned seat-portion 7a and the reclining seat-portion 7b, have respective pairs of lugs 8 and 9 spaced at a predetermined distance on both sides thereof in a manner such that the respective lugs 8 and 9 can be inserted into the corresponding opening 13 provided on the supporting members as described.

The detailed features of the lug and opening arrangement according to this embodiment are specifically shown in FIG. 5, wherein the seat-portion 7a or 7b being moved downward in such a manner as shown by the dashed lines is fixed in position when the respective pairs of lugs 8 and 9 come to rest on the corresponding forward edges of the openings 13a formed in the side portions 20a.

Normally, the respective pairs of lugs 8 and 9 on both sides of the cushioned seat-portion 7a are inserted in the corresponding opening formed in the respective lower supporting members 11. However, the respective forward lugs 8 on both sides of the reclining seat-portion can be inserted in the corresponding openings formed in the respective lower supporting members 11, while the respective back lugs 9 are inserted in the corresponding openings formed in the respective upper supporting members 10, which are located at a relatively appropriate longitudinal position thereof with respect to the corresponding openings formed in the lower supporting members to allow the reclining seat-portion to recline backward when assembled.

The respective front portion of the cushioned seat-portion 7a and the reclining seat-portion 7b are both made of a cushioning material, while the respective rear surfaces thereof are lined with a flat hard board 37 as shown in FIG. 4, whereby when the seat portion is mounted upside down on the supporting members with its hard board facing upward these respective seat-portions can be used as a rack or shelf. The arrangement of the respective lug and opening connections described in the foregoing may be replaced by an arrangement of respective latch type connections wherein the bars are provided on the respective seat-portions while the respective receivers are provided on the corresponding supporting members in a manner as described in the foregoing.

Referring now to FIGS. 6 to 10, there are shown modified embodiments of the lug and opening arrangements of the present invention.

Figure 6:
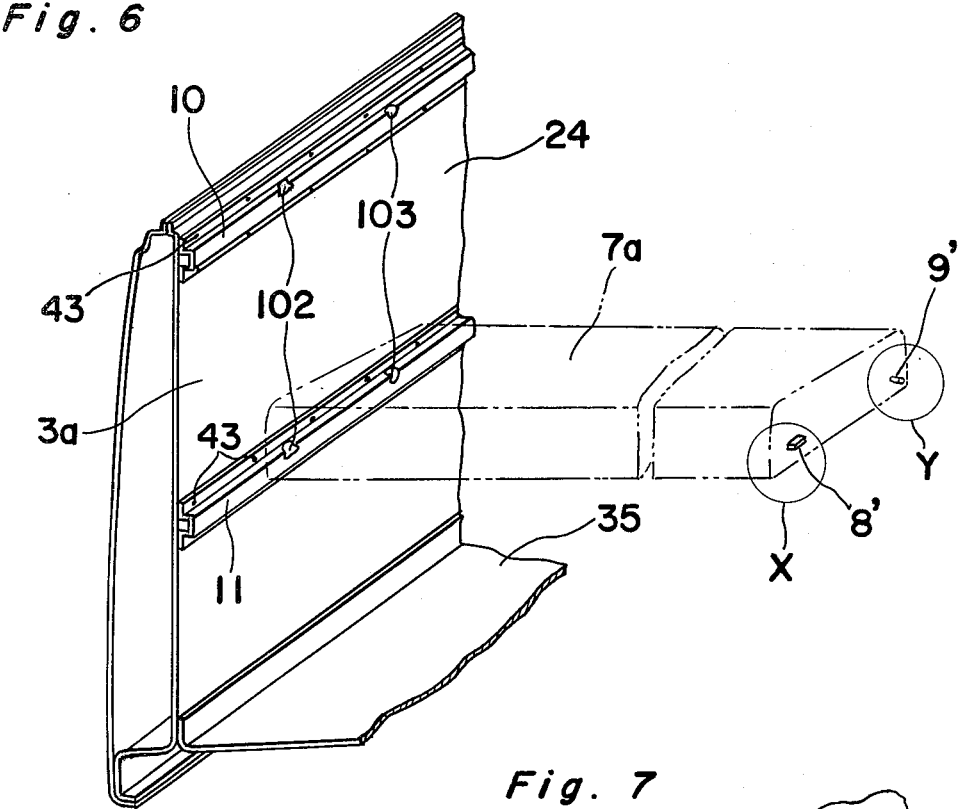
FIG. 6 is a perspective fragmentary view showing on an enlarged scale, a modification of the present invention.
Figure 7:
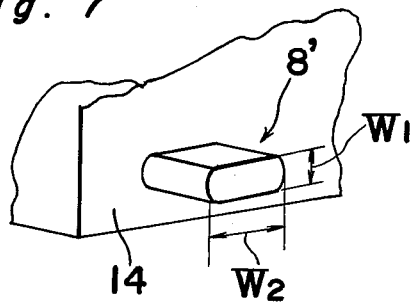
FIG. 7 is a perspective view showing on an enlarged scale the portion of FIG. 6 which is encircled by Y.

As shown in FIGS. 6 and 7, a longitudinally extending front lug 8' is mounted on each of the side frames 14 of the respective seat-portions having an approximately rectangular cross section with its respective corner portions being rounded, wherein the width denoted by $W_2$ which extends substantially parallel with respect to the side of the seat-portion is wider than the vertical height $W_1$.

Figure 8:
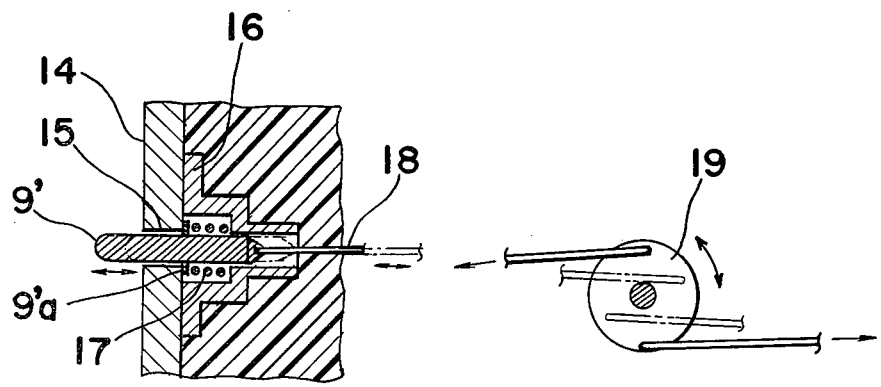
FIG. 8 is a sectional view showing on an enlarged scale, the lug shown in the portion of FIG. 6 which is encircled by Y, FIG. 9 (I) is a perspective view showing a modification of the supporting members of FIG. 3, FIG. 9 (II) is a cross-sectional view of the supporting member of FIG. 9 (I), FIG. 9 (III) is a perspective view of a portion of the supporting member of FIG. 9 (I), FIG. 10 (I) is a perspective view of the other modified embodiment of the supporting members of FIG. 3, FIG. 10 (II) is a cross-sectional view of the supporting member of FIG. 10 (I), FIG. 10 (III) is a perspective view of a portion of the supporting member of FIG. 10 (I)

Located further to the rear of the van type vehicle than the modified lug 8' is a rear lug 9' as shown in FIGS. 6 and 8, which has a semi-cylindrical shape with its forward end rounded. Furthermore, the lug 9' which extends through a bore 15 formed in the frame 14 as shown in FIG. 8, is accommodated inside the frame 14 and is urged outwardly by means of a spring 17 and projects through a collar 9'a, the entire unit being accommodated inside casing frame 16 which lines the rear surface of the frame 14.

More specifically, this lug 9' is arranged to be drawn inside the frame 14 against the resilient force of the spring 17 as shown in an imaginary line in FIG. 8 by the inwardly drawing action of an operating wire 18 secured to an inner end of the lug 9' in a manner as described hereinbelow. The operating wire 18 is connected to a rotor 19 which is actuated by locking and releasing levers (not shown) which are located at appropriate positions associated with the cushioned seat-portion 7a as well as the reclining seat-portion 7b, whereby the projectable lug 9' is arranged to be pulled inside the frame by the inwardly drawing action of the wire 18 described above when the rotor 19 is locked, and is caused to project when the rotor 19 is released.

As shown in FIG. 6, the respective lugs 8' are arranged to be engaged in corresponding openings 102 having structural characteristics as described hereinbelow while the respective lugs 9' are arranged to be engaged in corresponding grooves having other structural characteristics as described hereinbelow. The respective supporting members are nearly the same as that described in the foregoing except for shapes of the respective openings.

Figure 9:
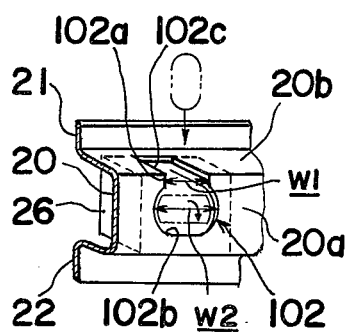

The respective openings 102 for accommodating and receiving therein the respective lugs 8', (i.e. the cutout portions in top and side portions 20b and 20a), combine to form an L-shaped opening as shown in FIG. 9, which is an approximately circular cutout 102b continuous with a rectangular cutout portion 102a which is continuous with the rectangular cutout 102c of top portion 20b as shown in FIG. 9 (I).

Specifically, a width $w_1$ of the openings 102a and 102c as shown in FIG. 9 (I) is arranged to be wider than that part of the lug 8' designated by $W_1$ while being smaller than that part of the lug 8' designated by $W_2$ in FIG. 7. In connection with the above description width $w_2$ of the grooves 102b is wider than the width designated by $W_1$ so that the lug 8' is slidably inserted and rotated into position inside the circular opening 12b in a manner as specifically shown by the imaginary line in FIG. 9 (I) when the lug is to be inserted therein as shown in FIG. 9 (II).

More specifically, as shown in FIG. 9 an elastic member 26 made of rubber or plastic and having a dimension for location within the projected portion 20 of the supporting member 10 or 11 at the location of the opening 102 as well as a specific, inner configuration as shown in FIG. 9 is fixedly attached to the supporting member at the respective rear surfaces of the side flat portion 20a and the top portion 20b as shown by broken line 1 in FIG. 9 (I). Therefore, these two members cooperatively support the lug 8' when the lug 8' is inserted therein. Although member 26 has an equivalently formed bore 27 having portions corresponding to those of the cutout portions 102a, 102b, and 102c, a bore portion 27b which is continuous with the cutout portion 102b has dimensions which are somewhat smaller than the dimensions of the reclining portion 102b of the opening 102. A groove 27d having a rectangular cross section is located at the bottom wall of bore portion 27b for allowing the walls of the circular bore portion 27b to be elastically extended in the radial direction.

Figure 10:
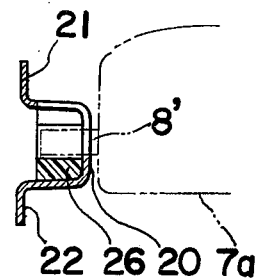
Figure 10:
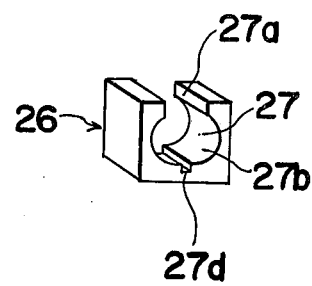
Figure 10:
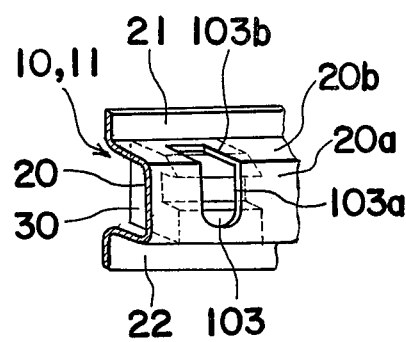

In contrast to the opening 102 which is designed for accommodating the lug 8', respective opening 103 for accommodating and inserting the respective projectable lugs 9' therein have a configuration as shown in FIG. 10, in which the opening 103 which extends from the top portion 20b to the side flat portion 20a not only includes a U-shaped opening 103b formed on the side portion 20b and a U-shaped opening 103a formed on the top flat portion 20a, but also the width of the opening 103, i.e., those of the respective openings 103a and 103b, is wide enough to accommodate the projectable lug 9' therein as described as follows.

As shown in FIG. 10, the opening of this embodiment also has a member 30 made of rubber or plastic located within support members 10 and 11 as shown in FIG. 10(III) for firmly supporting the lug which is accommodated therein and thereby is firmly attached to the supporting member at the respective rear surfaces of the side flat portion 20a and the top portion 20b in a manner as shown by the broken line in FIG. 10(I).

More specifically, the member 30 as shown in FIG. 10(III) is formed having a specific configuration wherein the top wall has a tapered surface 31 which slants from the top surface of the wall, the tapered surface facing the upper portion of the side flat portion 20a. The member 30 also has a recessed portion 32 extending inward from lower wall of the tapered side surface described above. The relationship between the projectable lug 9' is such that the lug 9' is inserted in the opening 103a of the side flat portion 20a in the manner shown by the imaginary line in FIG. 10(II) and as will be described hereinbelow.

The detailed features and operation of the paired lug and opening combinations of the above described embodiments, and the assembling procedures concerning the respective seat-portions, are described hereinbelow.

When the cushioned seat-portion is to be supported by the respective supporting members 11 through the insertion of the lugs 8' and 9' in the openings 102 and 103 of the supporting members 11, the seat-portion 7a which is not presently suppported is first rotated along its front-rear axis by an angle of approximately 90 degrees from its normally flat position with the rear portion of the seat now located higher than the front portion. The lugs 8' are then inserted into the cutout 102b and bore portion 27b via cutouts 102a and 27a and rotated 90 degrees thereby reversing the previously described 90 degree rotation.

Specifically the lug is inserted with its greater width extending vertically and narrower width extending horizontally and rotated as described previously so that the elastic member 27 stretches and holds the lug 8' firmly therein.

While the above process is taking place the lug 9' approaches opening 103 and member 30 in approximately flat alignment. As lug 9' enters opening 103, slanting surface 31 forces it into the casing frame 16 until lug 9' clears the outer edge of slanted surface 31 at which time the lug 9' is again forced outward by spring 17 into recess 32 and thereby firmly engaged with member 30.

As a result of the series of successive movements concerning the cushioned seat-portion 7a described in the foregoing, the cushioned seat-portion 7a is fixed in position so that it extends horizontally across and between the pair of the supporting members 11. Furthermore, when the respective lugs 8' are rotated inside the circular openings 102b and bore portions 27b of the openings 102 which support them as described in the foregoing, the respective lugs 8' force the member 27 to stretch in the radial direction of the circular opening formed in the member because groove 27d has a rectangular cross section as described previously. Therefore, after the insertion of the lug in the opening as shown in this embodiment is completed, the lug 8' is held firmly inside the opening 27 by the resilient force of the member 27 as described previously.

Because of the combination of various forces holding the lug in the opening 27 as described above, not only is the lug 8' prevented from disengaging by the counteracting or because of twisting force or movement which may be brought about when an excess load is exerted locally on the adjacent lugs 9', but also undesirable noise and vibration is prevented which might be otherwise brought about by direct contact of the metallic parts because of the movement of the van.

Although the manner of assembling the reclining seat-portion provided with the lugs as previously described is not substantially different from that of the cushioned seat-portion described in the foregoing, the forwardly located lugs are inserted into the specific openings formed in the lower supporting member 11 while the rear lugs are inserted into the specific openings formed on the upper supporting members 10.

However, for further convenience in assembling the reclining seat-portion 7b, the opening 103 formed in the supporting member 10 for engagement with the lug 9' as described previously may be further modified so that the opening 103, including its internal groove is much wider for inclination in a substantially vertical direction as compared to the previously described embodiment so that the lugs 9' are successively received in openings, following the reclining relative movement of the reclining seat-portion and the lugs 9' thereof.

In reverse order to the assembling procedure described in the foregoing, when the pair of the lug-opening arrangements 8' and 102 as well as 9' and 103 are to be disengaged to disassemble the rear seat 7 or the reclining seat-portion 7b which extends across the supporting members 10 and 11, the respective lugs 9' are first inwardly withdrawn for disengagement from the groove 32 described above by rotation of the rotor 10 which is actuated by the lock-releasing lever, and thereby, a series of successive steps to assemble the back seat or the reclining seat-portion are taken.

Figure 11:
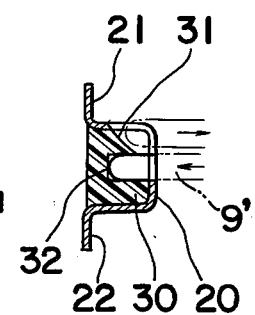
FIG. 11 is a perspective view of a modified embodiment of the supporting members of FIGS. 1 and 2.
Figure 11:
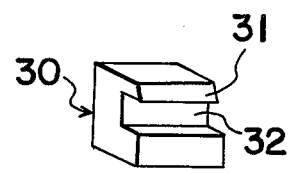
Figure 11:
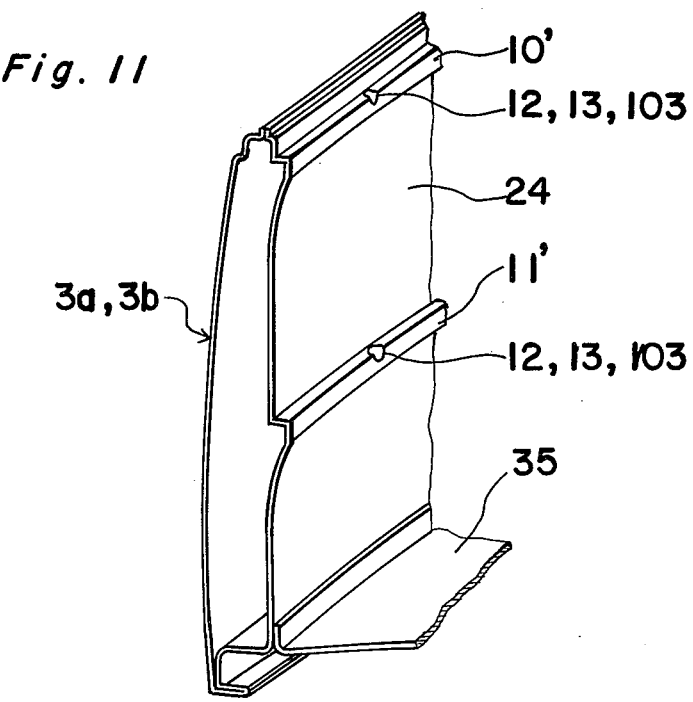

Furthermore, as shown in FIG. 11 in the modified embodiment of the present invention the respective supporting members 10' and 11' and an inner panel 24 or the respective inner walls 24 of the rear compartment 2 which are manufactured as a unit for example, by pressing, can be provided wherein the separate step of attaching the supporting members 10' and 11' to the respective inner walls is avoided.

Another modified embodiment of the present invention includes providing a board having a pair of the lugs as described in the foregoing for example, for making a bed as well as for assembling a rack etc., thereby making it possible to use the rear compartment of a van type motor vehicle for many purposes when the boards as described above are assembled and disassembled, depending on necessity.

The various arrangements for using the rear compartment according to the teachings of the present invention are shown in FIG. 12.

FIG. 12(I) shows a normal use of the rear compartment 2 of the van type motor vehicle, wherein the front seat and the back seat including the driving seat are arranged for accommodating nine persons, since the back seat is assembled by means of the lug and opening arrangement on the respective pairs of the supporting members 10 and 11 while the front seat is assembled with the respective leg-portions thereof, so that two transverse rows of seats are provided facing the direction of advance of the motor vehicle.

FIG. 12(II) shows another embodiment using the rear compartment 2 with a bed therein, when the van type vehicle is used either as a camping car or for a place to sleep wherein the back seat 7 is disassembled so that the cushioned seat-portion 7a and the reclining seat-portion are assembled so that they extend parallel to each other across the vehicle on the respective upper supporting members 10 with the cushioned portions thereof facing substantially upward. In the arrangement described above a bed 30 is made at the upper portion extending above the compartment 31, which becomes available for either storing gear or for sleeping in the rear compartment 2 of the van type motor vehicle.

FIG. 12(III) shows another embodiment for using the whole rear compartment 2 as a place to sleep wherein the front seat 6 is accommodated in a hanger formed at the forward end wall of the rear compartment 2 with the respective seat portions 6a and 6b being folded up. In the arrangement shown the whole floor of the gear compartment 2 is used either as a space 32 to sleep or as a space for storing gear. Moreover, two beds vertically staged, including the upper bed 30 described in the foregoing may be constructed.

FIG. 12(IV) shows an embodiment for using the rear compartment 2 to store gear as well as leaving space for the front seat wherein the back seat 7 is also disassembled with the cushioned seat-portion 7a and the reclining seat-portion 7b both assembled on the respective upper supporting members 10 and extending in parallel across the direction of advance of the vehicle with both portions assembled upside down so that the rear hard backboard 17 can be used as a rack 33 which vertically divides the rear compartment into two spaces.

In a modified embodiment with reference to the constructional simplification of the present invention, the cushioned seat-portion 7a may be modified to be of a type which is readily assembled either on the floor 35 or the side walls of the rear compartment 2, and is provided with a hinge arrangement, to which one end portion of the reclining seat-portion 7b is readily connected, whereby the leg supporting members are omitted.

As in clear from the foregoing description of the present invention a van type motor vehicle is provided with a special arrangement for the rear compartment 2 wherein the back seat assembled in the rear compartment can be disassembled for creating either a space for gear or a space for sleeping as needed.

Furthermore, the cushioned seat-portion 7a and the reclining seat-portion 7b can be assembled parallel to each other across the direction of driving on the supporting members which are provided substantially at the center between the floor and the ceiling of the rear compartment 2, to provide either a bed or a rack arrangement and thereby utilize the space in the rear compartment 2 effectively for many purposes.

Still furthermore, the arrangements for assembling the respective seat-portions on the respective supporting members are provided with the simplified lug and opening arrangements as described in the present invention whereby the various forms and combinations of the lug and opening arrangements of this invention are adapted for use in many variations for effectively utilizing the rear compartment of the van type motor vehicle, only if the supporting members and the attaching positions of the members mentioned above are so modified as to perform the proper engagements of the lug and opening arrangements as described.

Although the present invention has been fully described by way of reference to the accompanying drawings, it is noted that various changes and modifications will be apparent to those skilled in the art. Therefore, unless such changes and modifications otherwise depart from the scope of the present invention, they should be construed as included therein.

What is claimed is:

1. A seat and seat support means for converting the rear compartment of a van type vehicle into a space which can be used for multiple purposes, comprising:
   a pair of spaced opposed side body coverings, a front wall and back wall making up the walls of said rear compartment;
   at least one seat positioned in a rear portion of said rear compartment and including a cushioned seat portion and a separate reclining seat portion, said seat portions constituting a reclinable type seat;
   engaging means on each of said seat-portions constituted by respective pairs of engaging members provided on opposite sides of said respective seat portions;
   lower and upper pairs of supporting members fixedly attached to the inside surfaces of said space opposed side body-coverings, said supporting members extending in the direction of advance of said motor vehicle, each supporting member of each of said respective pairs of said supporting members being positioned at the same height above the van floor, said upper pair of said supporting members being positioned approximately midway of the vertical dimension of said rear compartment; and
   a plurality of receiving means located on said supporting members for receiving said engaging members for supporting said seat portions in one of two positions, a first position wherein said cushioned seat portion is supported fully on the lower one of said pairs of said supporting members wherein said respective pairs of engaging members of said cushioned seat portion are received in said receiving means located on said lower pair of said supporting members, and said reclining seat portion having one of said respective pairs of said engaging members received in receiving means on said lower pair of support members and a second pair of said respective pairs of engaging members received in receiving means located on said upper pair of said supporting members for forming a reclinable type seat, and a second position wherein both said cushioned seat portion and said reclining seat portion are supported on said lower pair of supporting members in the same manner that said cushioned seat portion is supported in said first position, or both of said seat portions are supported on said upper pair of said supporting members.

2. A seat and seat support means for converting the rear compartment of a van type vehicle into a space which can be used for multiple purposes and having said engaging members and said receiving members as defined in claim 1 wherein said engaging members and said receiving means comprise:

a plurality of openings located on said supporting members for receiving said engaging members;

said engaging members are pairs of lugs located on respective sides of said seat portions extending in said direction of advance of said vehicle, a first pair of lugs being for accommodation in a first of openings in each said supporting member, and a second pair of lugs being for accommodation in a second pair of openings in each said supporting member;

said first pair of lugs extending from each of said respective sides of said seat portions and having a generally rectangular cross-section with rounded corners wherein one dimension in said direction of travel of said vehicle is greater than a second dimension which is perpendicular to said direction of travel of said vehicle;

said first pair of openings having dimensions substantially equal to said dimensions of said first pair of lugs, said openings further having a top section narrower than said one dimension but smaller than said second dimension of said first pair of lugs, said supporting members having at said location wherein said first pair of openings are located and fixedly attached thereto on their inner surfaces a first pair of elastic members having openings therein which are coextensive with said first pair of openings on said supporting members, said openings on said elastic members having the same shape as said first pair of lugs and being of approximately the same dimensions, said elastic members having a bottom wall of said opening, said bottom wall having a groove therein for allowing said elastic members to stretch when said first pair of lugs are fitted therein, said first pair of lugs being inserted in said first openings and said first pair of elastic members by turning said seat portion so that said longer dimension of said first pair of lugs extends in a direction perpendicular to said direction of travel of said vehicle;

said second pair of lugs resiliently projecting from each of said respective sides of said seat portion, and spring means urging each of said respective lugs of said second pair of lugs outward, said second pair of lugs having a generally oval cross section;

said second pair of openings having a slant member located on said supporting members at the position of each opening of said second pair of openings and fixed within said supporting members, said slant member having a groove extending in the direction of travel of said vehicle, said groove being bounded by a top and bottom wall of said slant member, said top wall of said slant member having top and bottom surfaces, said top surface slanting at an angle toward the floor of said rear compartment and connecting with said bottom surface at the outer edges thereof, said second pair of lugs being inserted into said second pair of openings and said slant member subsequent to said first pair of lugs being inserted into their corresponding openings so that said second pair of lugs approach said second pair of openings from a substantially perpendicular direction so that upon contact with said slanted top surface said second pair of lugs are forced into said respective seat sides until said top surface is cleared whereupon said spring means urges said second pair of lugs into said groove in said slant member; and retracting means located in said seat portions for retracting said second pair of lugs into said seat portion against the force of said spring means for disengaging said second pair of lugs from said second pair of openings and slant means.

3. A seat and seat support means for converting the rear compartment of a van type vehicle with a space which can be used for multiple purposes as claimed in claim 2 wherein said first pair of lugs are located on respective sides of said seat portions and located toward the front of said seat positions in said direction of travel of said vehicle when said seat portions have said cushioned surface facing upward and said second pair of lugs are located on respective sides of said seat portions and located toward the rear of said seat portions in said direction of travel of said vehicle when said seat portions have said cushioned surface facing upward.

4. A seat and seat support means for converting the rear compartment of a van type vehicle into a space which can be used for multiple purposes as claimed in claim 1 further including a front seat of an assembled type capable of being folded up located in front of said seat in said rear compartment and a hanger provided on said front wall wherein said front seat can be hung on said hanger with respective seat portions of said front seat being folded up.

5. A seat and seat support means for converting the rear compartment of a van type vehicle into a space which can be used for multiple purposes as claimed in claim 1 wherein the respective rear surfaces of said respective seat portions are made of a hard material whereby when said respective seat portions are positioned with said respective hard rear surfaces facing up and said respective seat portions extend parallel to and are supported by said supporting members, said seat portions form a rack in said rear compartment.

6. A seat and seat support means for converting the rear compartment of a van type vehicle into a space which can be used for multiple purposes as claimed in claim 2 wherein said first pair of elastic members have an opening substantially equal in shape but of slightly smaller dimensions than said first pair of openings.

7. A seat and seat support means for converting the rear compartment of a van type vehicle into a space which can be used for multiple purposes as claimed in claim 1 including at least one flat plate provided with respective pairs of lugs on respective side faces, said plate having dimensions transverse to said direction of advance of said vehicle sufficient to be transversely supported by said supporting members in the same manner as said seat portion of said seat.

* * * * *